J. T. WILLIAMS.
LOGGING CAR.
APPLICATION FILED JUNE 14, 1912.

1,069,050.

Patented July 29, 1913.

Witnesses:
C. T. Scofield
Madison Boone

Inventor:
J. T. Williams

UNITED STATES PATENT OFFICE.

JOHN T. WILLIAMS, OF SANS SOUCI, NORTH CAROLINA.

LOGGING-CAR.

1,069,050.  Specification of Letters Patent.  Patented July 29, 1913.

Application filed June 14, 1912. Serial No. 703,766.

*To all whom it may concern:*

Be it known that I, JOHN T. WILLIAMS, a citizen of the United States, residing at Sans Souci, in the county of Bertie and State of North Carolina, have invented certain new and useful Improvements in Logging-Cars, of which the following is a specification, reference being had to the accompanying drawings.

My invention relates to new and useful improvements in gasolene trucks and more particularly to a truck adapted for use in connection with the logging industry and the primary object of the invention is to provide a simple and efficient device of this character which is adapted to supersede the devices now in use for conveying logs from place to place.

A further object of the invention resides in providing a pair of trucks, one of which is provided with a rigid and the other with a rocking bolster adapted to support the logs thereon, and a still further object resides in the provision of a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

Figure 1:
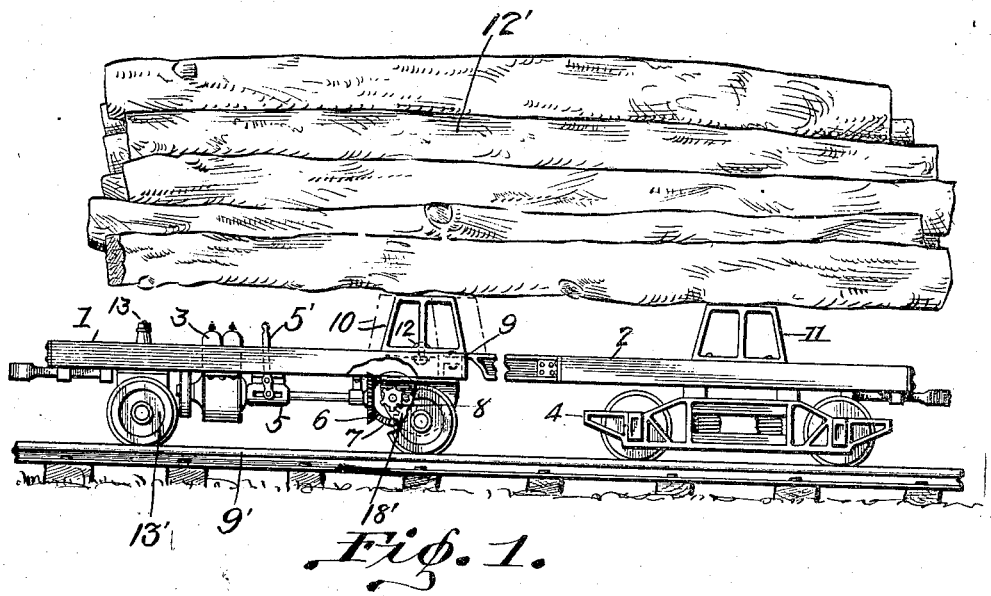
Figure 2:
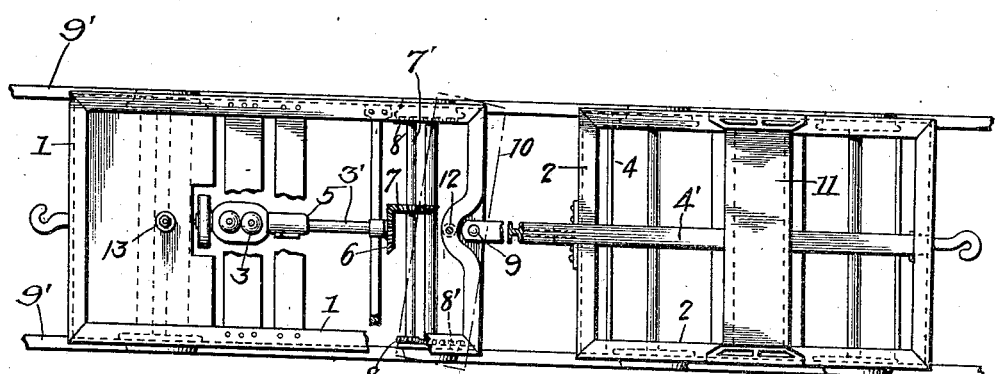

In the accompanying drawing forming a part of this application, Figure 1 is a side elevation of the device with parts thereof broken away; and Fig. 2 is a plan view thereof with parts broken away.

In describing my invention, I shall refer to the drawing in which similar reference characters designate corresponding parts throughout the several views and in which 1 and 2 indicate frames rigidly supported on the trucks 4, said frames being connected together by means of a central longitudinal beam 4' which is pivotally connected to the frame 1, at the point 9 and is rigidly engaged with the frame 2. Suitably mounted on the frame 1 is a gasolene engine 3 of any desired horsepower and extending longitudinally of the frame 1, is the drive shaft 3', said drive shaft having the reversible clutch 5 mounted in the length thereof which is readily operable by means of the lever 5'. The rear end of the drive shaft 3' has the beveled gear 6 mounted thereon which meshes with a similar gear 7 carried on a transverse shaft 7'. This transverse shaft 7' is disposed just forward of the rear wheels of the truck 4 and has mounted on the ends thereof the pinions 8 which are meshed with the gears 8' mounted in connection with the inner faces of the last mentioned wheels. From this construction it will be seen that as the engine 3 is operated, the rear wheels of the truck carrying the frame 1 will be caused to rotate in either one direction or the other, as the case may be, thereby driving the device on the rails 9'.

Pivotally mounted at the point 12, on the rear portion of the frame 1 is a rocking bolster 10, while an additional bolster 11 is rigidly mounted on the frame 2. These bolsters 10 and 11 are adapted to directly receive the logs 12' thereon and thus the movement of the forward frame with respect to the rear frame will be compensated for. In this connection, it must be also stated that a pony truck 13' is pivotally mounted on the frame 1 at the forward end thereof through the medium of the king bolt 13. As the engine transmission is mounted in connection with a truck which is rigidly mounted on the frame 1, however, it will be seen that the various parts thereof cannot vibrate without the complete frame and truck vibrating therewith.

From the foregoing description of the construction of my improved device, the operation thereof will be readily understood and it will be seen that I have provided a simple inexpensive, and efficient means for carrying out the objects of the invention.

While I have particularly described the elements best adapted to perform the functions set forth, it is obvious that various changes in form, proportion and in the minor details of construction may be resorted to without departing from the spirit or sacrificing any of the principles of the invention.

Having thus described this invention, what I claim is:—

A device of the class described comprising a pair of frame sections respectively mounted on trucks, a central beam mounted on one of said trucks and extending beyond the forward end of the same, the free end of said beam being pivotally connected to the rear end of the other truck, a bolster rigidly mounted on the upper face of the first mentioned truck, and an additional bolster oscillatingly mounted from its center on the upper face of the last mentioned truck adjacent the rear end of the latter.

In testimony whereof I hereunto affix my signature in the presence of two witnesses.

JOHN T. WILLIAMS.

Witnesses:
R. J. SHEILD,
GEO. RODGERS.

Copies of this patent may be obtained for five cents each, by addressing the "Commissioner of Patents, Washington, D. C."